United States Patent
Banerjee et al.

(10) Patent No.: US 11,121,960 B2
(45) Date of Patent: Sep. 14, 2021

(54) DETECTING AND MANAGING RELOCATION OF NETWORK COMMUNICATION ENDPOINTS IN A DISTRIBUTED COMPUTING ENVIRONMENT

(71) Applicant: International Business Machines Corporation, Armonk, NY (US)

(72) Inventors: Dwip N. Banerjee, Austin, TX (US); Maria Joseph Frederic Durairaj, Tamilnadu (IN); Sivakumar Krishnasamy, Bangalore (IN); James L. Hall, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/426,729

(22) Filed: May 30, 2019

(65) Prior Publication Data
US 2020/0382405 A1    Dec. 3, 2020

(51) Int. Cl.
*H04L 12/751* (2013.01)
*G06F 9/455* (2018.01)
*H04L 12/727* (2013.01)
*H04L 29/08* (2006.01)

(52) U.S. Cl.
CPC .......... *H04L 45/02* (2013.01); *G06F 9/45558* (2013.01); *H04L 45/121* (2013.01); *G06F 2009/45595* (2013.01); *H04L 67/10* (2013.01)

(58) Field of Classification Search
CPC ....... H04L 45/02; H04L 45/14; H04L 45/121; H04L 45/586; H04L 45/745; H04L 67/10; H04L 67/148; G06F 9/45558; G06F 9/4856; G06F 9/5088; G06F 2009/45595; G06F 11/203; G06F 16/119
See application file for complete search history.

(56) References Cited

U.S. PATENT DOCUMENTS

| 8,825,964 B1 * | 9/2014 | Sopka ............... G06F 3/0671 711/152 |
| 8,914,546 B2 | 12/2014 | Kawamoto et al. |

(Continued)

OTHER PUBLICATIONS

Chaufournier et al., "Fast Transparent Virtual Machine Migration in Distributed Edge Clouds," SEC '17, Oct. 12-14, 2017, 13 pages.

*Primary Examiner* — Kan Yuen
(74) *Attorney, Agent, or Firm* — Patterson + Sheridan, LLP (57) ABSTRACT

Techniques for managing communications between applications executing in a distributed computing environment are presented. An example method includes detecting, by a first virtual machine, that an application has migrated from a source virtual machine to a destination virtual machine in the distributed computing environment. The first virtual machine identifies a location of the destination virtual machine in the distributed computing environment. Based on the identified location, the first virtual machine generates one or more routing rules for communications between applications executing on the first virtual machine and the migrated application, wherein the one or more routing rules comprise rules that minimize latency and processing overhead for communications with the migrated application in the distributed computing environment.

19 Claims, 5 Drawing Sheets

(56) References Cited

U.S. PATENT DOCUMENTS

| | | | | |
|---|---|---|---|---|
| 8,935,695 B1* | 1/2015 | Rajaa | ................ | G06F 9/45558 |
| | | | | 718/1 |
| 8,997,094 B2 | 3/2015 | Bosch et al. | | |
| 9,141,625 B1 | 9/2015 | Thornewell et al. | | |
| 9,519,512 B2 | 12/2016 | Kami | | |
| 2012/0054367 A1* | 3/2012 | Ramakrishnan | ...... | G06F 9/4856 |
| | | | | 709/242 |
| 2013/0262801 A1* | 10/2013 | Sancheti | ............... | G06F 3/0619 |
| | | | | 711/162 |
| 2013/0308646 A1* | 11/2013 | Sajassi | ................... | H04L 45/04 |
| | | | | 370/395.53 |
| 2015/0052521 A1 | 2/2015 | Raghu | | |
| 2015/0106913 A1* | 4/2015 | Wang | ................ | H04L 63/0236 |
| | | | | 726/13 |
| 2015/0143367 A1* | 5/2015 | Jia | ........................ | G06F 9/5016 |
| | | | | 718/1 |
| 2016/0259661 A1* | 9/2016 | Tasoulas | ............... | G06F 9/5077 |

* cited by examiner

DETECTING AND MANAGING RELOCATION OF NETWORK COMMUNICATION ENDPOINTS IN A DISTRIBUTED COMPUTING ENVIRONMENT

BACKGROUND

The present invention relates to managing network connections in a distributed computing environment, and more specifically, to adjusting how applications executing within the distributed computing environment communicate with other applications executing within the distributed computing environment as applications migrate between different virtual and/or physical machines in the distributed computing environment.

A distributed computing environment may include multiple physical computing devices, and any number of virtual machines may execute on each physical computing device. Virtual machines may be added to and removed from the distributed computing environment as the compute requirements of users of the distributed computing environment change. For example, as additional resources are needed to perform a particular task for a particular user in the distributed computing environment, virtual machine instances can be created and added to the distributed computing environment. As the load on the virtual machines generated for a particular user decreases, some virtual machines may be shut down and removed from the distributed computing environment, which may free resources for use by other users of the distributed computing environment.

In some cases, to perform load balancing and avoid performance degradation for users in the distributed computing instance, virtual machines and/or applications executing thereon may be migrated to other physical or virtual machines operating in the virtual computing environment. Generally, virtual machines may be migrated between different physical machines, and applications executing on a virtual machine (e.g., containerized applications) may be migrated between different virtual machines operating on the same or different physical machines. When virtual machines or applications executing on virtual machines migrate from one machine to another, routing information that allows applications to communicate within the distributed computing environment may change, and routing information may be updated in response to reflect the migration and allow for continued execution of applications within the distributed computing environment. Prior to and after migration, applications may communicate with each other by communicating through a network stack (e.g., using the Transmission Control Protocol/Internet Protocol stack), which generally provides for packetizing communications and routing communications to the appropriate destination (e.g., the virtual machine with which an application executing on another virtual machine is communicating). Packetizing and routing communications using a network stack may impose a processing overhead on each packet generated, and generating packets for communications regardless of whether a sending and receiving virtual machine are the same, different virtual machines hosted on the same physical machine, or virtual machines hosted on different physical machines may add to the amount of data processed within a distributed computing system.

SUMMARY

One embodiment of the present disclosure provides a method for managing communications between applications executing in a distributed computing environment as applications migrate between virtual computing instances in the distributed computing environment. The method generally includes detecting, by a first virtual machine, that an application has migrated from a source virtual machine to a destination virtual machine in the distributed computing environment. The first virtual machine identifies a location of the destination virtual machine in the distributed computing environment. Based on the identified location, the first virtual machine generates one or more routing rules for communications between applications executing on the first virtual machine and the migrated application, wherein the one or more routing rules comprise rules that minimize latency and processing overhead for communications with the migrated application in the distributed computing environment.

Another embodiment of the present disclosure provides a system having a processor and memory. The memory generally has instructions stored thereon which, when executed on the processor, performs an operation for managing communications between applications executing in a distributed computing environment as applications migrate between virtual computing instances in the distributed computing environment. The operation generally includes detecting, by a first virtual machine, that an application has migrated from a source virtual machine to a destination virtual machine in the distributed computing environment. The first virtual machine identifies a location of the destination virtual machine in the distributed computing environment. Based on the identified location, the first virtual machine generates one or more routing rules for communications between applications executing on the first virtual machine and the migrated application, wherein the one or more routing rules comprise rules that minimize latency and processing overhead for communications with the migrated application in the distributed computing environment.

Still another embodiment of the present disclosure provides a computer-readable medium having instructions stored thereon which, when executed on a processor, performs an operation for managing communications between applications executing in a distributed computing environment as applications migrate between virtual computing instances in the distributed computing environment. The operation generally includes detecting, by a first virtual machine, that an application has migrated from a source virtual machine to a destination virtual machine in the distributed computing environment. The first virtual machine identifies a location of the destination virtual machine in the distributed computing environment. Based on the identified location, the first virtual machine generates one or more routing rules for communications between applications executing on the first virtual machine and the migrated application, wherein the one or more routing rules comprise rules that minimize latency and processing overhead for communications with the migrated application in the distributed computing environment.

DETAILED DESCRIPTION

Embodiments described herein describe techniques for managing network routes used by applications in a distributed computing environment as virtual machines and/or applications migrate between physical or virtual machines in the distributed computing environment. Generally, network routes within a distributed computing environment may be managed by each virtual machine in the virtual computing environment. These network routes may specify how communications between different applications or services are to be performed based on the location of the application or service relative to the virtual machine. Generally, routes used for communications between applications or services executing on the same virtual machine or on different virtual machines operating on the same physical machine may specify that lower latency, lower overhead mechanisms relative to the full network stack be used for such communications than routes used for communications between applications or services executing on different virtual machines hosted by different physical machines.

By modifying routes used by applications or services in a distributed computing environment as such applications or services migrate between different virtual or physical machines, embodiments presented herein may reduce network latency and network load within the distributed computing environment. Specifying the use of routes that avoid transmitting packets outside of a physical computer system for communications between applications or services residing on the same physical computer system—whether the applications or services execute on the same virtual machine or different virtual machines—may reduce the amount of time an application or service spends waiting for messages from other applications residing on the same physical computer system. Further, because communications between applications or services residing on the same physical computer system may not generate packets transmitted outside of the physical computer system (e.g., packets transmitted from the physical computer system to physical network infrastructure for routing to a destination physical computer system), embodiments presented herein may reduce the amount of traffic on a network used by the distributed computing system for transmitting data between different virtual machines in the distributed computing environment.

Figure 1:
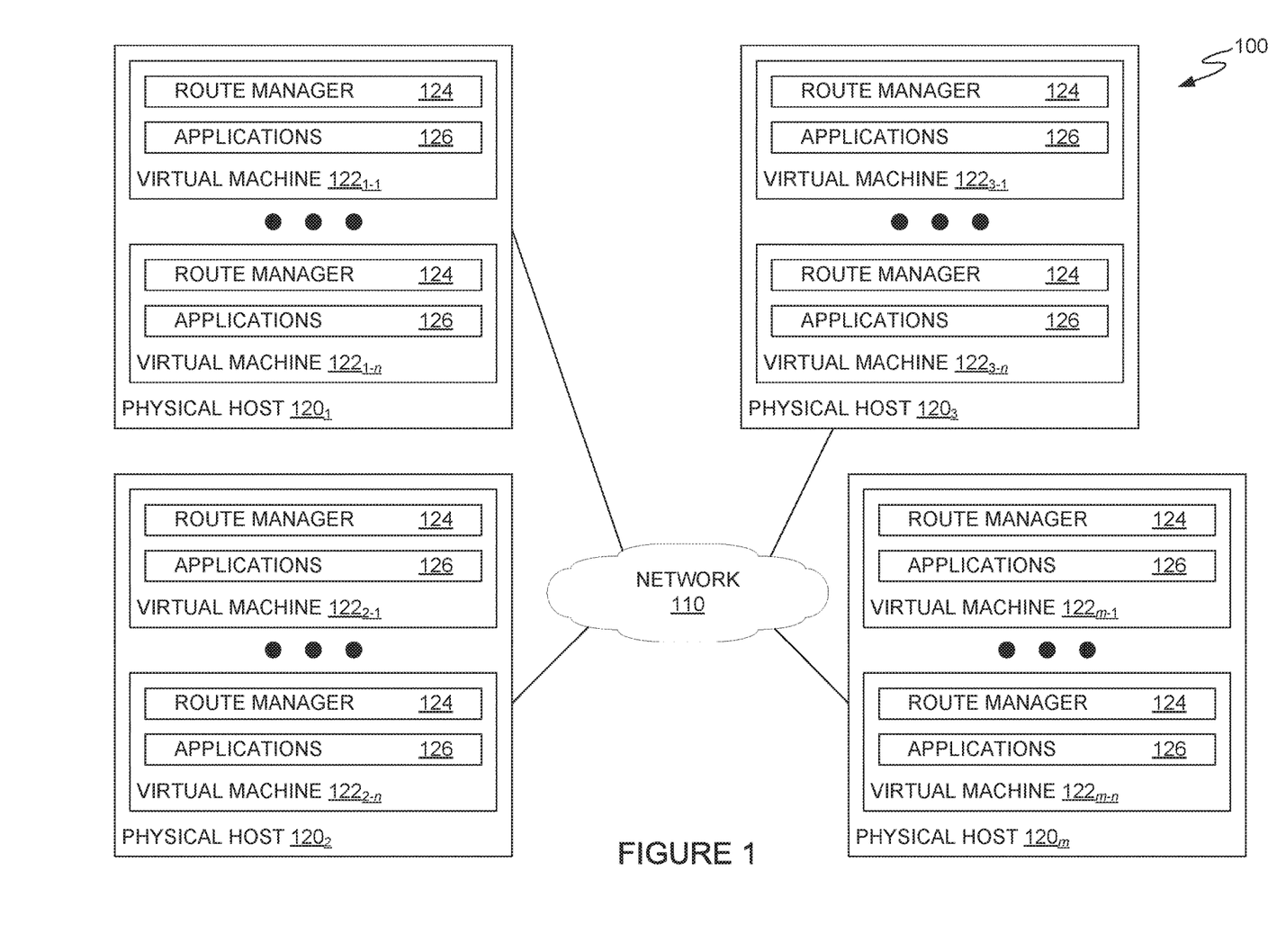
FIG. 1 illustrates an example distributed computing environment in which route management on virtual machines hosted in the distributed computing environment manage routes for communicating with different applications executing in the distributed computing environment, according to one embodiment.

FIG. 1 illustrates an example distributed computing environment 100 in which route management is performed on virtual machines executing in the distributed computing environment 100 to manage network routes used by applications for communications within the distributed computing environment 100, according to an embodiment. As illustrated, computing environment 100 includes a plurality of physical hosts 120 (e.g., physical hosts $120_1$-$120_m$ illustrated in FIG. 1), each of which is connected to network 110 for communications between virtual machines executing on each of the physical hosts 120.

Physical host 120 is generally representative of a physical computing system, such as a server or mainframe computer, that may contribute computing resources to a distributed computing system for use by one or more users of the distributed computing system. As illustrated, each physical host 120 may host one or more virtual machines 122. Each virtual machine 122 generally uses a portion of the computing resources available on a physical host 120 to serve a user's computing needs. Over time, to load balance across the physical hosts 120 in the distributed computing environment, virtual machines 122 or applications executing on the virtual machines 122 (e.g., containerized applications that can be migrated between virtual machines 122) may be migrated from one physical host to another physical host.

As illustrated, each virtual machine hosts a route manager 124 and one or more applications 126. Route manager 124 is generally configured to monitor the distributed computing environment 100 for migration of virtual machines and/or applications and update network routing information associated with the applications executing within the distributed computing environment 100. Generally, route manager 124 may regenerate routing information for applications when new virtual machines are added to distributed computing environment 100, previously established connections become invalid (e.g., communications over an existing connection are not successfully delivered within a timeout period, etc.), or when applications or services migrate to or from a physical host 120 in the distributed computing environment.

Route manager 124 generally detects movements of applications or services in a distributed computing environment based on network route validation/invalidation or notifications from a virtual networking system executing on a physical host 120. For example, when an IP address or a socket address is added to a system, route manager 124 may invalidate route information cached at virtual machine 120, and the invalidation of route information may serve as a trigger for route manager 124 to identify new routing information for applications or services executing in distributed computing environment 100. In another example, when a route becomes invalid (e.g., communications between applications fail because the destination application has moved to another virtual machine), route manager 124 can detect that the route becomes invalid from a failure to deliver communications to a destination application. The failure to deliver communications to the destination application using previously cached route information may serve as a trigger for route manager 124 to identify new routing information for applications or services executing in distributed computing environment 100.

In some cases, route manager 124 may be triggered to determine new routing information for communications with an application based on notifications received from a virtual networking system on a first physical host $120_1$. For example, when an application is migrated from a source virtual machine on a second physical host $120_2$ to a destination virtual machine on the first physical host $120_1$, the virtual networking system on the first physical host $120_1$ may generate a notification to each of the virtual machines 122 executing on the first physical host $120_1$. Based on the notification, route manager 124 can determine that routing information for communications with the application should be updated to use intra-physical host communications channels (e.g., connections that take advantage of the application being on the same physical host $120_1$). Conversely, when an application is migrated from a source virtual machine on a first physical host $120_1$ to a destination virtual machine on a second physical host $120_2$, the virtual networking system on the first physical host $120_1$ may detect that the connection with the migrated application is a connection established over physical network infrastructure (e.g., a connection between the first physical host $120_1$ and the second physical host $120_2$ through a physical switch or router external to both the first and second physical hosts). Based on this detection, the virtual networking system can generate a notification to route manager 124 indicating that intra-physical host communications channels with the migrated application are no longer valid. Route manager 124 on a virtual machine 120 executing in the distributed computing environment 100, in response, can discover a new route to the migrated application and update routing information accordingly for communications between applications executing on a virtual machine 120 and the migrated application on the destination virtual machine.

To determine new routing rules for communications with a migrated application, route manager 124 can attempt to establish a network connection with the virtual machine on which the migrated application is executing, based on an assumption that new network connections are opened when applications are migrated to a destination virtual machine. The attempt to establish a network connection may utilize, for example, the TCP handshake procedure of transmitting a synchronize (SYN) packet to the virtual machine on which the migrated application is executing, receiving a SYN acknowledgment (ACK) (SYN-ACK) packet from the virtual machine on which the migrated application is executing, and transmitting an ACK packet to the virtual machine on which the migrated application is executing. Using the address information and information about the interface through which communications were performed with the virtual machine on which the migrated application is executing, route manager 124 can identify the connection through which subsequent communications with the application should be performed. For example, if route manager 124 determines that communications with the application were performed using a loopback interface, route manager 124 can determine that the migrated application is being hosted on the same virtual machine 120. To leverage efficiencies in communications between applications executing on the same virtual machine and correspondingly reduce the amount of network traffic put on the physical infrastructure connecting different physical hosts 120 in the distributed computing environment, route manager 124 can use lower latency, higher speed connections between applications executing on the same physical host 120 and the like. These lower latency, higher speed connections may, for example, bypass part or all of the network stack executing on a virtual machine 122 so as to facilitate communications between applications executing on the same physical host 120 without generating and transmitting packets to physical networking infrastructure in the distributed computing environment 100. In some embodiments, route manager 124 may generate routing rules specifying that communications with the migrated application are to be performed using a fast loopback interface on the virtual machine 122. The fast loopback interface may, in some embodiments allow data to be copied from the transmission buffer of a first application to a reception buffer of the virtual machine on which the migrated application executes and may bypass TCP packet tracking and other mechanisms for facilitating guaranteed delivery of packets over a network connection.

In some embodiments, applications executing on a first virtual machine may communicate with a migrated application through a persistent network connection (e.g., a connection that remains open for multiple exchanges of data. For such connections, the routing tables may be updated to activate or deactivate various network connection properties based on the location of the destination virtual machine on which the migrated application is executing and based on notifications received from a virtual networking system of a physical host 120 after migration of the application to the destination virtual machine. For example, route manager 124 can activate or deactivate large packet transmission options based on whether the destination virtual machine is located on the same physical host 120. Large packet transmission options may, for example, allow for the generation and transmission of non-standard-sized packets to the destination virtual machine, which may reduce the number of packets generated for any given amount of data to be transmitted to the destination virtual machine and accordingly reduce the number of processor cycles needed to transmit the data to the destination virtual machine.

If, however, route manager 124 determines that communications with the virtual machine on which the migrated application is executing was performed on a network interface other than the loopback interface, route manager 124 can determine that the virtual machine on which the migrated application is executing is a different virtual machine from that on which route manager 124 is executing. Route manager 124 can thus use information from a virtual networking system on physical host 120 to determine whether the virtual machine on which the migrated application is executing is hosted on the same physical host 120 or on a different physical host. If the migrated application is executing on the same physical host 120, route manager 124 can generate routing rules specifying the use of lower latency connections between the virtual machines 122 on the physical host 120 for communications with the migrated application. These lower latency connections may, for example, include hipersockets or other communications channels that do not result in the generation and transmission of network packets to physical networking infrastructure in the distributed computing environment 100. For example, communications on these lower latency connections may entail the generation of packets that are transmitted from a virtual machine 122 to virtual network systems executing on the physical host 120. The virtual network systems executing on physical host 120 may subsequently route the received packets to the appropriate destination virtual machine 122 executing on physical host 120 (i.e., the virtual machine 122 on which a migrated application executes). If, however, the migrated application is executing on a different physical host 120, route manager 124 can initiate a connection with the virtual machine on which the migrated application executes via physical networking infrastructure in the distributed computing environment.

In some embodiments, an application may be migrated in such a manner in which a previous route configuration may still be valid for subsequent communications with the application, and only the IP address of the destination virtual machine may need to be updated for subsequent communications with the migrated application. For example, if an application is migrated from one virtual machine 122 to another virtual machine 122 executing on the same physical host, the previous route configuration indicating that a hipersocket or virtual networking channel is to be used for communications with the migrated application may remain valid. In another example, if a virtual machine is migrated from one physical host 120 to a different physical host 120, the previous route configuration indicating that physical networking infrastructure is to be used for communications with the migrated application may remain valid. In these cases, route manager 124 of virtual machine $122_{1\text{-}1}$ can identify that a previous route has been invalidated and determine that the virtual networking system did not generate a notification that the destination virtual machine on which the migrated application executes was not moved into or out of the physical host $120_1$ on which virtual machine $122_{1\text{-}1}$ executes.

In some embodiments, routing updates performed by route manager 124 may be performed in a seamless manner such that communications with the migrated application are not interrupted. Where an application migrates from an environment in which communications are performed on a fast loopback interface to an environment in which communications are performed over virtual networking systems in a physical host 120 or physical network infrastructure in distributed computing environment 100, route invalidation may return an error to the networking stack indicating that the network connection has been interrupted. In response, the networking stack on a virtual machine 122 may packetize data and transmit the data using the next TCP sequence number. Subsequent communications with the virtual machine 122 on which the migrated application executes may use acknowledgment messages of TCP packets and missing acknowledgment messages to determine whether data has been successfully transmitted to the virtual machine 122 on which the migrated application executes. Missing acknowledgment messages for a TCP packet with a given sequence number may, thus, indicate that a packet has not been successfully transmitted and should be retransmitted to the virtual machine 122 on which the migrated application executes.

Where an application migrates from an environment in which communications are performed over virtual networking systems in a physical host 120 or physical network infrastructure in distributed computing environment 100 to an environment in which communications are performed on a loopback or fast loopback interface, the networking stack may freeze the current state of the connection with the virtual machine on which the migrated application executes. Freezing the current state of the connection may entail, for example, saving the current packet sequence number, last acknowledged packet number, congestion window information, timers, and the like. Route manager 124 may, as discussed above, migrate the connection with the virtual machine on which the migrated application executes to a fast loopback or other low latency connection that allows for communications with the migrated application without the generation of communications packets transmitted from the virtual machine 122 to virtual networking systems on physical host 120 and/or physical networking infrastructure in the distributed computing environment 100.

Applications 126 are generally illustrative of various applications that users of the distributed computing environment 100 may deploy on virtual machines 122 within the distributed computing environment 100. These applications 126 may, in some embodiments, be installed directly on virtual machines 122, and migration of such applications may be performed when the virtual machine 122 on which the application is installed is migrated from one physical host 120 to another physical host 120. In some embodiments, applications 126 may be containerized applications that may be migrated across virtual computing instances. In such cases, the container associated with an application, including information such as application state, received/cached packets, etc. may be migrated at runtime to any virtual machine 122 executing in the distributed computing environment 100.

Figure 2A:
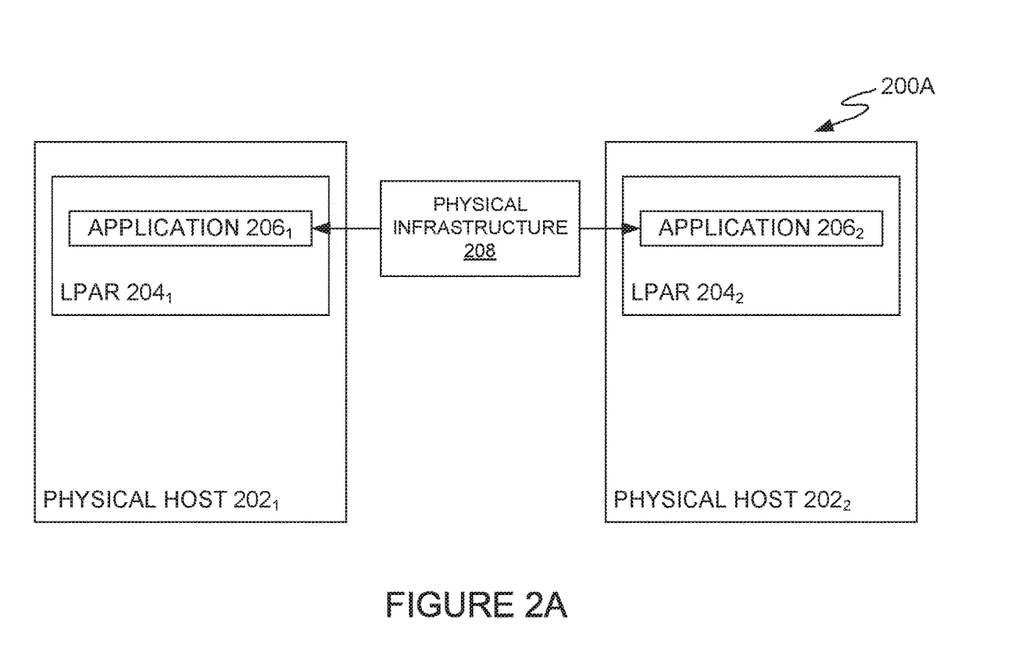
FIGS. 2A-2C illustrate examples of routing configurations for communications between different applications executing in a distributed computing environment that may be generated as applications migrate between virtual machines and/or physical machines in the distributed computing environment, according to one embodiment.
Figure 2B:
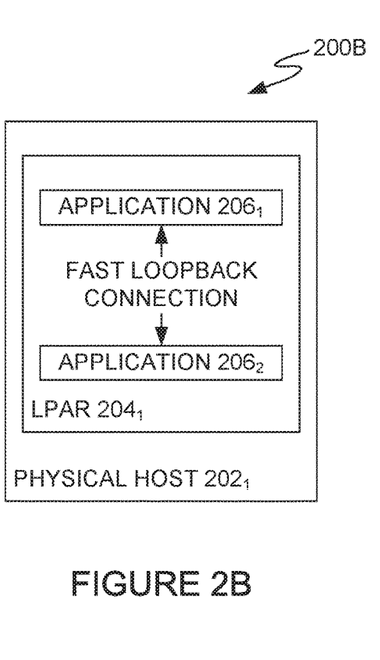
Figure 2C:
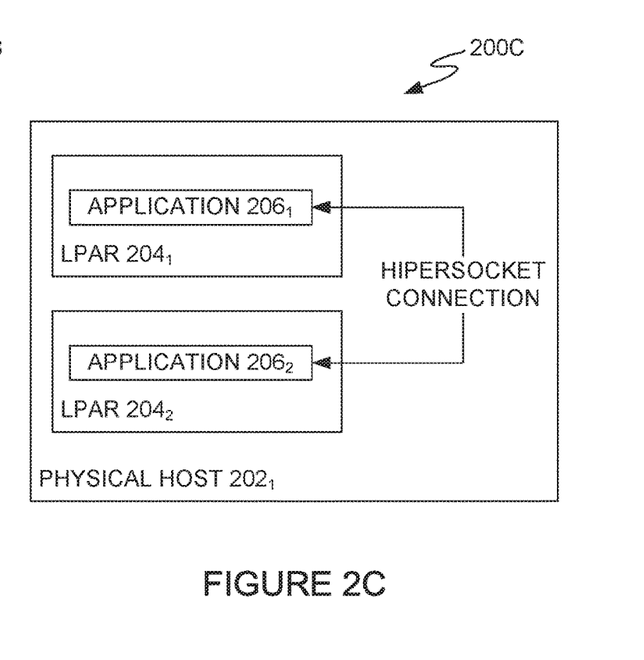

FIGS. 2A through 2C illustrate example routing configurations for applications executing within a distributed computing environment (e.g., distributed computing environment 100 illustrated in FIG. 1), according to some embodiments.

FIG. 2A illustrates a routing configuration 200A for applications executing on different physical hosts in a distributed computing environment. As illustrated, a distributed computing environment may include a first physical host $202_1$ and a second physical host $202_2$, each of which hosts a logical partition (LPAR) $204_1$ and $204_2$, respectively. LPARs $204_1$ and $204_2$ are generally representative of virtual machines or other containers simulating a computing device and providing resources on which users of the distributed computing environment can deploy one or more applications (e.g., applications $206_1$ and $206_2$). Because application $206_1$ and application $206_2$ are executing on different physical hosts 202 in routing configuration 200A, routing information generated by a route manager on each LPAR 204 may specify that communications between applications $206_1$ and $206_2$ are to be performed using a network connection through physical infrastructure 208 in the distributed computing environment. Physical infrastructure 208 is generally representative of physical networking infrastructure that connects physical hosts $202_1$ and $202_2$ to a network and may include, for example, wired or wireless physical switches, routers, gateways, etc.

FIG. 2B illustrates a routing configuration 200B for applications executing on the same virtual machine in a distributed computing environment. As illustrated, applications $206_1$ and $206_2$ are executing on the same logical partition (LPAR $204_1$) hosted on physical host $202_1$. Because applications $206_1$ and $206_2$ are executing on LPAR $204_1$, communications between these applications need not involve packetized communications through a virtual networking system executing on physical host $202_1$ or physical infrastructure 208 illustrated in FIG. 2A. Thus, route manager 124 on LPAR $204_1$ may generate routing information specifying that a fast loopback connection is to be used for communications between applications $206_1$ and $206_2$. As discussed, the fast loopback connection may generally entail the direct copying of data from a transmission buffer associated with a first application executing on LPAR $204_1$ to a reception buffer associated with a second application on LPAR $204_1$ so as to minimize the use of the network stack on LPAR $204_1$ for communications between applications $206_1$ and $206_2$.

FIG. 2C illustrates a routing configuration 200C for applications executing on different virtual machines hosted on the same physical host in a distributed computing environment. As illustrated, physical host $202_1$ hosts a first LPAR $204_1$ and a second LPAR $204_2$. Application $206_1$ executes on the first LPAR $204_1$, and application $206_2$ executes on the second LPAR $204_2$. Because applications $206_1$ and $206_2$ are not executing on the same LPAR, fast loopback connections may not be used for communications between these applications. However, because the LPARs on which applications $206_1$ and $206_2$ reside on the same physical host $202_1$, communications between applications $206_1$ and $206_2$ need not leave physical host $202_1$ (e.g., need not be transmitted, via physical networking connections, to physical networking infrastructure in the distributed computing environment for delivery to a destination executing on a different physical host in the distributed computing environment). Thus, route managers on LPARs $204_1$ and $204_2$ may configure routing information for communications between applications $206_1$ and $206_2$ to use a hipersocket or virtual networking connection, which allows for communications between these applications to remain within physical host $202_1$ and thus avoids increasing the traffic load on physical networking infrastructure within a distributed computing environment.

During operations of a distributed computing environment, routing configurations used for communications between different applications 206 may change as virtual machines and/or applications are migrated from one virtual machine in the distributed computing environment to another virtual machine in the distributed computing environment. For example, suppose that distributed computing environment begins in a state where applications $206_1$ and $206_2$ are hosted on the same virtual machine (LPAR $204_1$). The initial routing configuration for communications between applications $206_1$ and $206_2$ may thus correspond to routing configuration 200B illustrated in FIG. 2B. Now suppose that, as part of a load balancing operation, application $206_2$ is migrated to a virtual machine executing on a different physical host $202_2$. When application $206_2$ is migrated to a virtual machine executing on physical host $202_2$, the routing information allowing for the use of a fast loopback connection between applications $206_1$ and $206_2$ may now be invalid. The route managers executing on each of LPAR $204_1$ and $204_2$ may detect, based on address resolution protocols or other mechanisms, that application $206_2$ has been migrated to a different physical host. Thus, the route managers executing on each of LPAR $204_1$ and $204_2$ may change the routing configuration for communications between applications $206_1$ and $206_2$ to corresponding to routing configuration 200A illustrated in FIG. 2A. As discussed, changing to routing configuration 200A may entail writing a new rule to a set of routing rules on each LPAR 204 specifying that typical packetized network transmission protocols (e.g., TCP/IP) are to be used for communications between applications $206_1$ and $206_2$. Further, any communications that are queued may be packetized and transmitted using the next sequence number, and acknowledgments may be processed for each packet to determine whether (1) a packet was dropped within a distributed computing environment and (2) which packet to re-transmit if the packet was dropped.

Suppose, however, that instead of migrating to an LPAR executing on a different physical host 202, application $206_2$ migrates to another LPAR executing on physical host $202_1$. In such a case, communications between applications $206_1$ and $206_2$ may be performed through a virtual networking system executing on physical host 202 and need not be performed through packets transmitted outside of physical host $202_1$. Thus, a routing manager at each of LPARs $204_1$ and $204_2$ may generate routing rules indicating that communications between applications $206_1$ and $206_2$ are to be performed using a hipersocket (or virtual networking) connection. Thus, the route managers executing on each of LPAR $204_1$ and $204_2$ may change the routing configuration for communications between applications $206_1$ and $206_2$ to the routing configuration corresponding to configuration 200C illustrated in FIG. 2C.

It should be recognized that a routing configuration for applications 206 executing in a distributed computing environment may initially correspond to any of routing configurations 200 illustrated in FIG. 2. During operation of the distributed computing environment, routing configurations for an application executing in the distributed computing environment may change to any of the routing configurations 200 illustrated in FIG. 2.

Figure 3:
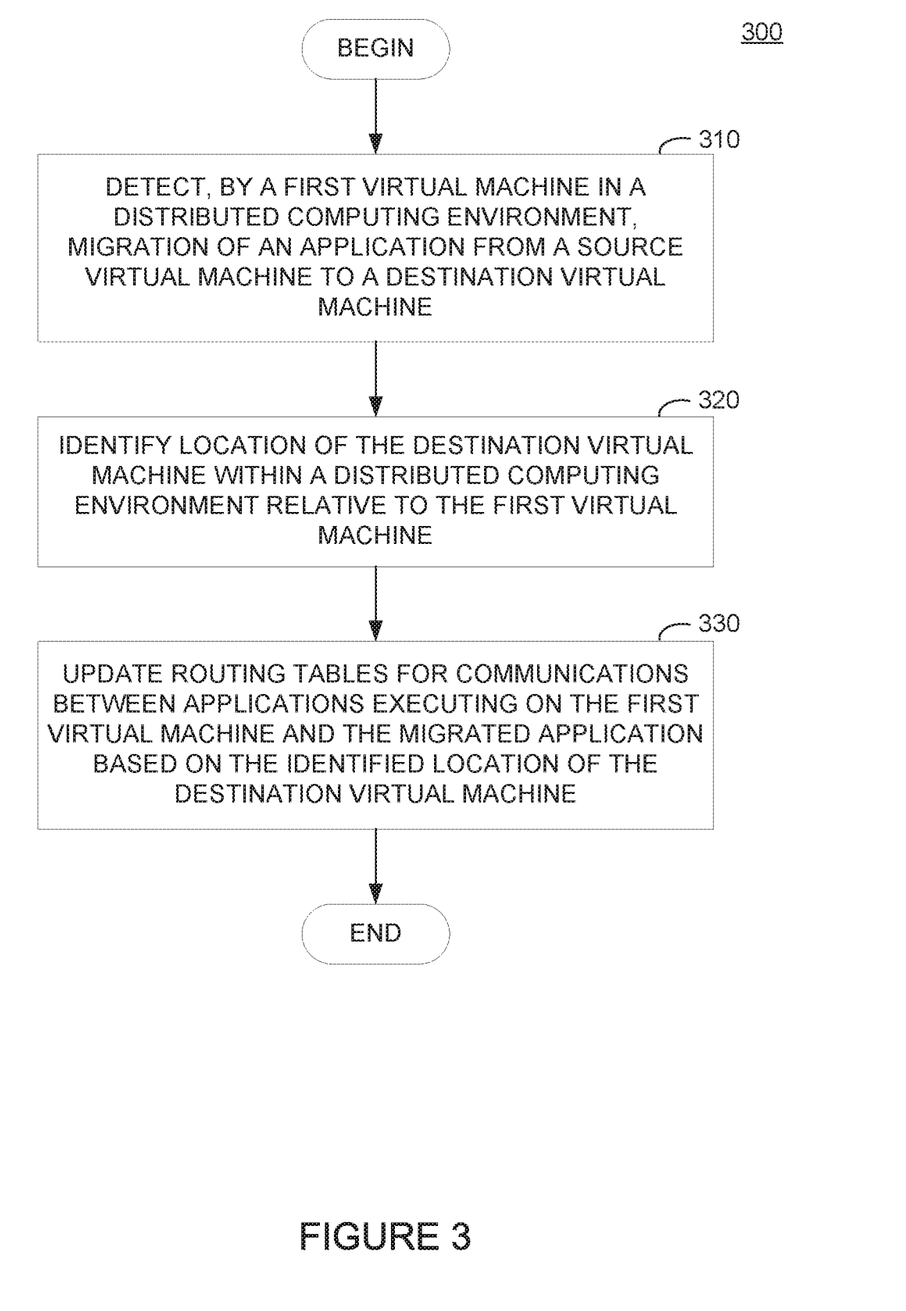
FIG. 3 illustrates example operations for managing routes used for communications between applications executing within a distributed computing environment, according to one embodiment.

FIG. 3 illustrates example operations 300 that may be performed by a first virtual machine for managing routes used for communications between applications executing within a distributed computing environment, according to one embodiment. Operations 300 may be performed, for example, by a network discovery module of an operating system executing on the first virtual machine, a network discovery module installed as an add-on to an operating system executing on the first virtual machine, or the like.

As illustrated, operations 300 begin at block 310, where the first virtual machine detects migration of an application from a source virtual machine to a destination virtual machine in the distributed computing environment. As discussed, the first virtual machine can detect migration of an application from a source virtual machine to a destination virtual machine based on failures to successfully communicate with a migrated application using previously determined routing information (e.g., TCP packet retransmission timeout). Migration of an application from a source virtual machine to a destination virtual machine may, in some embodiments, be detected based on route validation and invalidation when an IP address is added to a network, notifications generated by a virtual networking system on a physical host, and the like.

At block 320, the first virtual machine identifies a location of the destination virtual machine hosting the migrated application within a distributed computing environment relative to the first virtual machine. Generally, the location of the destination virtual machine may be identified based on whether the destination virtual machine is accessible via a loopback interface (e.g., lo0) or whether communications with the destination virtual machine entail communicating outside of a physical host machine (e.g., to a different physical host machine). If the destination virtual machine is accessible via a loopback interface, the destination virtual machine may be determined to be identical to the first virtual machine. If, however, the destination virtual machine is not accessible via a loopback interface, information from a virtual networking system on a physical host machine may be used to determine whether the destination virtual machine is hosted on the physical host machine or on a different physical host machine.

At block 330, the first virtual machine updates routing tables for communications between applications executing on the first virtual machine and the migrated application based on the identified location of the destination virtual machine. As discussed, information in the routing tables is generally used to identify a route to use for communicating with the migrated application that reduces or minimizes latency and processing overhead for communicating with the migrated application. For example, where applications are hosted on the same virtual machine (e.g., accessible via a loopback interface), the first virtual machine can generate an entry in a routing table specifying the use of a fast loopback interface for communications between these applications. As discussed, the fast loopback interface may allow for direct communications between applications executing on the same virtual machine without traversing a network stack, which may reduce latency in communicating between these applications. Where applications are hosted on different virtual machines hosted on the same physical machine, the first virtual machine can generate an entry in a routing table specifying the use of virtual networking interfaces for communications between these applications such that the applications can communicate without generating network packets that are transmitted to physical networking infrastructure for routing to a destination virtual machine.

Figure 4:
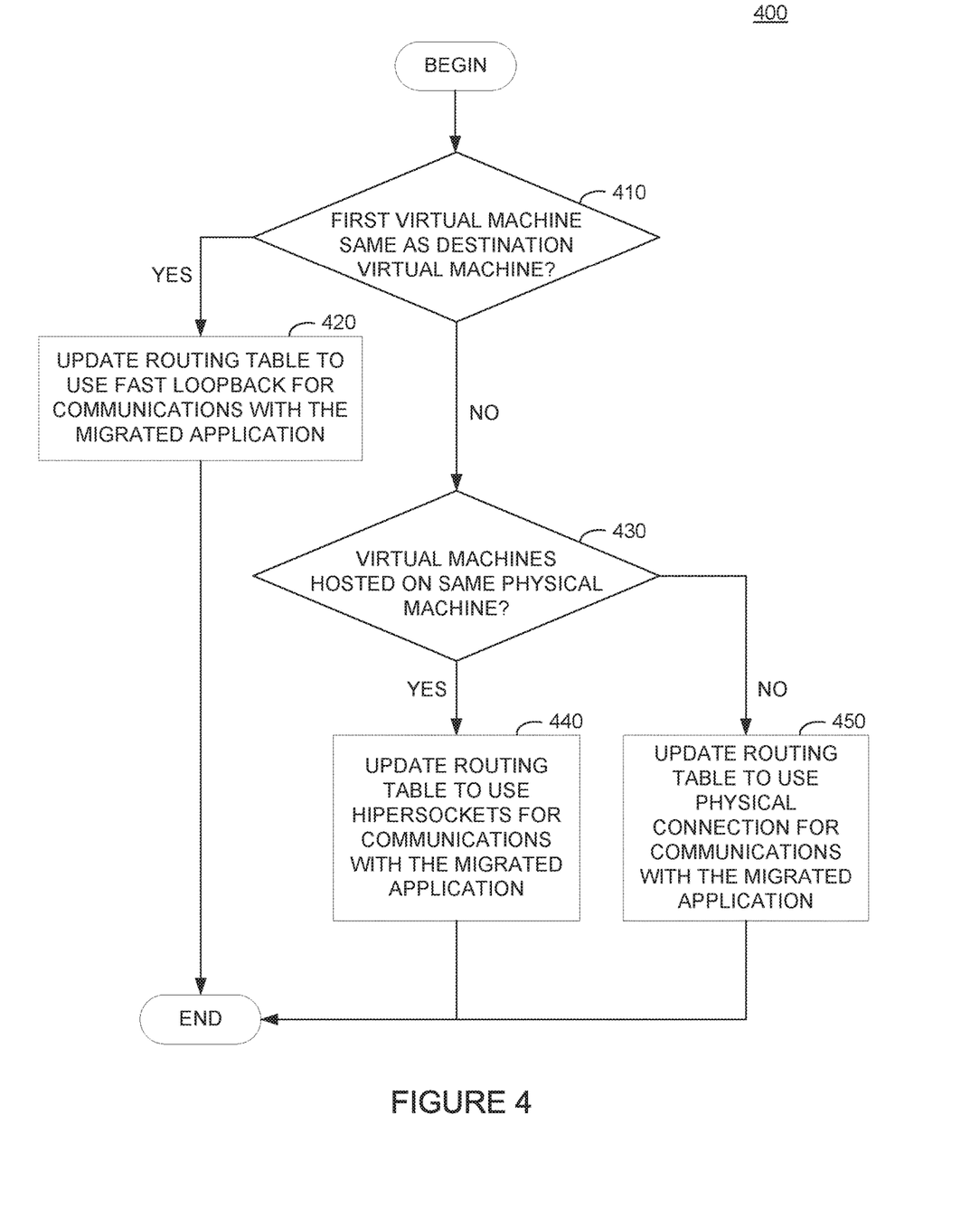
FIG. 4 illustrate example operations for identifying a type of network connection to use for communications between applications executing within a distributed computing environment, according to one embodiment.

FIG. 4 illustrates example operations 400 that may be performed by a first virtual machine to generate an entry in a routing table for an application upon migration of the application from a source virtual machine to a destination virtual machine, according to an embodiment. Operations 400 may be performed, for example, by a network discovery module of an operating system executing on the first virtual machine, a network discovery module installed as an add-on to an operating system executing on the first virtual machine, or the like.

As illustrated, operations 400 may begin at block 410, where the first virtual machine determines whether it is the same virtual machine as the destination virtual machine. As discussed, the first virtual machine can determine whether it is the same virtual machine as the destination virtual machine by establishing a connection with the migrated application executing on the destination virtual machine and determining whether a route generated through the connection is established through a loopback interface (e.g., lo0). If the first virtual machine is the same virtual machine as the destination virtual machine, operations 410 may proceed to block 420, where the first virtual machine updates a routing table to use fast loopback for communications with the migrated application.

If, at block 410, the first virtual machine determines that the destination virtual machine is a different virtual machine, operations 400 may proceed to block 430, where the first virtual machine determines whether the first virtual machine and the destination virtual machine are hosted on the same physical machine. The first virtual machine may determine whether the first virtual machine and the destination virtual machine are hosted on the same physical machine, for example, based on IP address blocks assigned to each physical host machine, notifications generated by a virtual networking system executing on the physical host machine hosting the first virtual machine, or the like. For example, if the source virtual machine was hosted on the same physical machine, and the migration of the application to the destination virtual machine did not generate a notification that the destination virtual machine is accessible via a connection over physical networking infrastructure, the first virtual machine can determine that the virtual machines are hosted on the same physical machine. In another example, if the virtual networking system on the physical machine generated a notification that the destination virtual machine has migrated to the physical machine, the first virtual machine can determine that the virtual machines are hosted on the same physical machine. The first virtual machine may determine that the first virtual machine and the destination virtual machine are different virtual machines, for example, based on notifications from the virtual networking system on the physical host that the destination virtual machine is accessible via a connection through physical networking infrastructure.

If, at block 430, the first virtual machine determines that the destination virtual machine is hosted on the same physical machine, at block 440, the first virtual machine updates routing tables to use hipersockets or other low latency cross-virtual-machine communications routes with the migrated application executing on the destination virtual machine. Generally, these low latency cross-virtual-machine communications route may include routes that generate traffic through a virtual networking system on the physical host machine, but avoid or minimize communications with the migrated application through physical networking infrastructure in the distributed computing environment. Otherwise, at block 450, the first virtual machine updates a routing table to use a physical network connection for communications with the migrated application.

Figure 5:
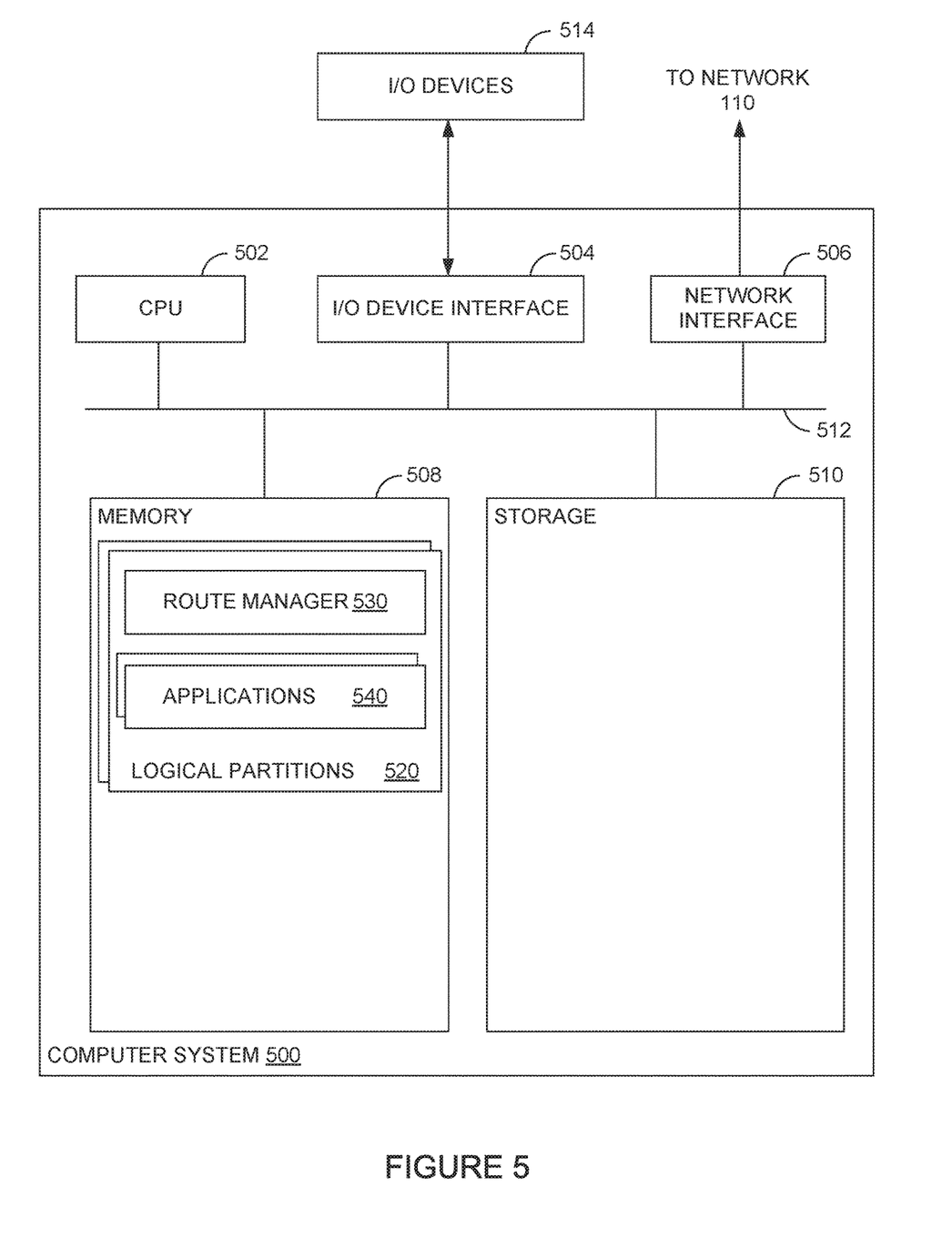
FIG. 5 illustrates an example system in which aspects of the present disclosure may be performed.

FIG. 5 illustrates an example computer system 500 that identifies communications routes between virtual machines in a distributed computing environment to reduce communications latency and processing overhead for communications between applications in the distributed computing environment, according to an embodiment. As illustrated, computer system 500 includes, without limitation, a central processing unit 502, one or more I/O device interfaces 504, which may allow for the connection of various I/O devices 514 (e.g., keyboards, displays, mouse devices, pen input, etc.) to the computer system 500, network interface 506, a memory 508, storage 510, and an interconnect 512.

CPU 502 may retrieve and execute programming instructions stored in the memory 508. Similarly, the CPU 502 may retrieve and store application residing in the memory 508. The interconnect 512 transmits programming instructions and application data among the CPU 502, I/O device interface 504, network interface 506, memory 508, and storage 510. CPU 502 is included to be representative of a single CPU, multiple CPUs, a single CPU having multiple processing cores, and the like. Additionally, the memory 508 is included to be representative of a random access memory. Furthermore, storage 510 may be a disk drive. Although shown as a single unit, the storage 510 may be a combination of fixed and/or removable storage devices, such as fixed disc drives, solid state drives, removable memory cards or optical storage, network attached storage (NAS), or a storage area network (SAN).

As illustrated, memory 508 includes one or more logical partitions 520 executing on the computer system 500. Each logical partition 520 may represent a virtual machine executing on computer system 500 which may be migrated to another computer system 500 dynamically within the distributed computing system in which the computer system 500 is a member. As illustrated, each logical partition 520 includes a route manager 530 and one or more applications 540. Route manager 530 generally monitors a distributed computing system in which computer system 500 is a member for migrations of applications and/or logical partitions (e.g., virtual machines) within a distributed computing environment. When an application or a logical partition migrates from one computer system to another in the distributed computing environment, route manager 530 determines whether the application has been migrated to the same logical partition 520 as that on which route manager 530 is executing and, if not, whether the application is executing on a logical partition 520 hosted on computer system 500 or on a different computer system. If route manager 530 determines that an application has been migrated to the same logical partition 520 on which route manager 530 is executing, route manager 530 can generate routing rules indicating that communications with the migrated application are to be performed using fast loopback or other low latency communications channels that allow for cross-process communications without generating network packets transmitted to a virtual networking system on computer system 500 or to physical networking infrastructure of the distributed computing environment. If route manager 530 determines that an application has been migrated to a different logical partition 520 on computer system 500, route manager 530 can generate routing rules indicating that communications with the migrated application should be performed through virtual networking systems on the computer system 500. If route manager 530 determines that an application has been migrated to a logical partition executing on a different computer system, route manager 530 can generate routing rules indicating that communications with the migrated application are to be performed through physical networking infrastructure in the distributed computing environment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. As applications migrate between virtual machine instances in the cloud, routing information for communications with the migrated application may be updated across other virtual machine instances in the cloud to reduce the processing overhead involved in communicating between applications hosted on the same virtual machine or on different virtual machines hosted on the same physical host. By regenerating routing information each time a system migrates from one virtual machine to another, embodiments described herein allow for the accelerated execution of computing jobs on virtual machines executing in the distributed computing environment.

While the foregoing is directed to embodiments of the present invention, other and further embodiments of the invention may be devised without departing from the basic scope thereof, and the scope thereof is determined by the claims that follow.

What is claimed is:

1. A method for managing communications between applications executing in a distributed computing environment by a first virtual machine, comprising:

detecting that an application has migrated from a source virtual machine to a destination virtual machine in the distributed computing environment such that the migrated application executes on the destination virtual machine and other applications executing on the source virtual machine prior to migration of the migrated application remain executing on the source virtual machine;

identifying a location of the destination virtual machine in the distributed computing environment, wherein identifying the location of the destination virtual machine in the distributed computing environment comprises identifying an interface through which communications with the destination virtual machine are performed; and based on the identified location, generating routing rules for communications between applications executing on the first virtual machine and the migrated application, wherein the routing rules minimize latency and processing overhead for network communications between applications executing on the first virtual machine with the migrated application executing on the destination virtual machine in the distributed computing environment.

2. The method of claim 1, wherein the identified interface comprises a loopback interface, and wherein the routing rules for communications between applications executing on the first virtual machine and the migrated application indicate that communications between applications executing on the first virtual machine and the migrated application are to be performed using a fast loopback interface.

3. The method of claim 1, wherein detecting that the application has migrated from the source virtual machine to the destination virtual machine in the distributed computing environment comprises:

receiving, from a virtual networking system of a physical machine hosting the first virtual machine, an indication that the destination virtual machine has been migrated to the physical machine, wherein the routing rules indicate that communications between applications executing on the first virtual machine and the migrated application are to be performed through the virtual networking system.

4. The method of claim 1, wherein detecting that the application has migrated from the source virtual machine to the destination virtual machine in the distributed computing environment comprises:

receiving, from a virtual networking system of a physical machine hosting the first virtual machine, an indication that the destination virtual machine has been migrated from the physical machine to a second physical machine, wherein the routing rules indicate that communications between applications executing on the first virtual machine and the migrated application are to be performed through a physical network connection between the physical machine and the second physical machine.

5. The method of claim 1, wherein detecting that the application has migrated from the source virtual machine to the destination virtual machine comprises determining that a previous route has become an invalid route.

6. The method of claim 1, wherein identifying the location of the destination virtual machine comprises establishing a connection between the first virtual machine and the destination virtual machine.

7. The method of claim 6, wherein identifying the location of the destination virtual machine further comprises:
determining that the connection was established on an interface other than a loopback interface; and
determining that the destination virtual machine did not migrate to or away from a physical host on which the first virtual machine executes, wherein the routing rules comprise previously established routing rules updated with a new address of the destination virtual machine.

8. A system, comprising:
a processor; and
a memory having instructions stored thereon which, when executed by the processor, perform an operation for managing communications between applications executing in a distributed computing environment by a first virtual machine, the operation comprising:
detecting that an application has migrated from a source virtual machine to a destination virtual machine in the distributed computing environment such that the migrated application executes on the destination virtual machine and other applications executing on the source virtual machine prior to migration of the migrated application remain executing on the source virtual machine;
identifying a location of the destination virtual machine in the distributed computing environment, wherein identifying the location of the destination virtual machine in the distributed computing environment comprises identifying an interface through which communications with the destination virtual machine are performed; and
based on the identified location, generating routing rules for communications between applications executing on the first virtual machine and the migrated application, wherein the routing rules minimize latency and processing overhead for network communications between applications executing on the first virtual machine with the migrated application executing on the destination virtual machine in the distributed computing environment.

9. The system of claim 8, wherein:
the routing rules for communications between applications executing on the first virtual machine and the migrated application indicate that communications between applications executing on the first virtual machine and the migrated application are to be performed using a fast loopback interface.

10. The system of claim 8, wherein detecting that the application has migrated from the source virtual machine to the destination virtual machine in the distributed computing environment comprises:
receiving, from a virtual networking system of a physical machine hosting the first virtual machine, an indication that the destination virtual machine has been migrated to the physical machine, wherein the routing rules indicate indicating that communications between applications executing on the first virtual machine and the migrated application are to be performed through the virtual networking system.

11. The system of claim 8, wherein detecting that the application has migrated from the source virtual machine to the destination virtual machine in the distributed computing environment comprises:
receiving, from a virtual networking system of a physical machine hosting the first virtual machine, an indication that the destination virtual machine has been migrated from the physical machine to a second physical machine, wherein the routing rules indicate that communications between applications executing on the first virtual machine and the migrated application are to be performed through a physical network connection between the physical machine and the second physical machine.

12. The system of claim 8, detecting that the application has migrated from the source virtual machine to the destination virtual machine comprises determining that a previous route has become an invalid route.

13. The system of claim 8, wherein identifying the location of the destination virtual machine comprises establishing a connection between the first virtual machine and the destination virtual machine.

14. The system of claim 13, wherein identifying the location of the destination virtual machine further comprises:
determining that the connection was established on an interface other than a loopback interface; and
determining that the destination virtual machine did not migrate to or away from a physical host on which the first virtual machine executes, wherein the routing rules comprise previously established routing rules updated with a new address of the destination virtual machine.

15. A non-transitory computer-readable medium having instructions stored thereon which, when executed on a processor, perform an operation for managing communications between applications executing in a distributed computing environment by a first virtual machine, the operation comprising:
detecting that an application has migrated from a source virtual machine to a destination virtual machine in the distributed computing environment such that the migrated application executes on the destination virtual machine and other applications executing on the source virtual machine prior to migration of the migrated application remain executing on the source virtual machine;
identifying a location of the destination virtual machine in the distributed computing environment, wherein identifying the location of the destination virtual machine in the distributed computing environment comprises identifying an interface through which communications with the destination virtual machine are performed; and
based on the identified location, generating routing rules for communications between applications executing on the first virtual machine and the migrated application, wherein the routing rules minimize latency and processing overhead for network communications between applications executing on the first virtual machine with the migrated application executing on the destination virtual machine in the distributed computing environment.

16. The non-transitory computer-readable medium of claim 15, wherein:
   the routing rules for communications between applications executing on the first virtual machine and the migrated application indicate that communications between applications executing on the first virtual machine and the migrated application are to be performed using a fast loopback interface.

17. The non-transitory computer-readable medium of claim 15, wherein detecting that the application has migrated from the source virtual machine to the destination virtual machine in the distributed computing environment comprises:
   receiving, from a virtual networking system of a physical machine hosting the first virtual machine, an indication that the destination virtual machine has been migrated to the physical machine, wherein the routing rules indicate that communications between applications executing on the first virtual machine and the migrated application are to be performed through the virtual networking system.

18. The non-transitory computer-readable medium of claim 15, wherein detecting that the application has migrated from the source virtual machine to the destination virtual machine in the distributed computing environment comprises:
   receiving, from a virtual networking system of a physical machine hosting the first virtual machine, an indication that the destination virtual machine has been migrated from the physical machine to a second physical machine, wherein the routing rules indicate that communications between applications executing on the first virtual machine and the migrated application are to be performed through a physical network connection between the physical machine and the second physical machine.

19. The non-transitory computer-readable medium of claim 15, wherein identifying the location of the destination virtual machine comprises:
   initiating an establishing a connection between the first virtual machine and the destination virtual machine;
   determining that the connection was established on an interface other than a loopback interface; and
   determining that the destination virtual machine did not migrate to or away from a physical host on which the first virtual machine executes, wherein the routing rules comprise previously established routing rules updated with a new address of the destination virtual machine.

* * * * *